United States Patent [19]

Lan

[11] Patent Number: 5,292,286
[45] Date of Patent: Mar. 8, 1994

[54] BICYCLE POWER TRAIN ASSEMBLY

[76] Inventor: Jin-Hua Lan, No. 3, Lane 12, Chin-Te Rd., Changhua City, Taiwan

[21] Appl. No.: 883,155

[22] Filed: May 14, 1992

[51] Int. Cl.$^5$ .............................................. F16H 9/00
[52] U.S. Cl. ....................................... 474/73; 474/78; 474/85; 474/116; 474/160; 474/164; 74/594.2
[58] Field of Search ..................................... 474/73–75, 474/77–80, 84–87, 116, 158, 160, 164; 74/594.2

[56] References Cited

U.S. PATENT DOCUMENTS

| | | | |
|---|---|---|---|
| 1,264,231 | 4/1918 | Wagner | 474/84 X |
| 2,277,727 | 3/1942 | Swanson | 474/160 X |
| 2,385,892 | 10/1945 | Swanson | 474/160 X |
| 3,862,579 | 1/1975 | Roberts | 74/89.2 |
| 3,913,944 | 10/1975 | Blow | 474/84 X |
| 4,173,154 | 11/1979 | Sawmiller | 474/84 X |
| 4,305,599 | 12/1981 | Houston | 74/125.5 X |
| 4,398,740 | 8/1983 | Clem | 474/84 X |
| 4,666,173 | 5/1987 | Graham | 74/47 X |
| 5,121,654 | 6/1992 | Fasce | 74/594.2 |

*Primary Examiner*—Ramon S. Britts
*Assistant Examiner*—Roger J. Schoeppel
*Attorney, Agent, or Firm*—Merchant, Gould, Smith, Edell, Welter & Schmidt

[57] ABSTRACT

A bicycle power train assembly includes a crank axle, a primary driving sprocket cluster mounted on one end of the crank axle, a rear wheel axle, a primary driven sprocket cluster mounted on one end of the rear wheel axle, a primary drive chain trained between the primary driving and driven sprocket clusters, a secondary driving sprocket mounted on the other end of the crank axle and rotating with the crank axle, a secondary driven sprocket mounted on the other end of the rear wheel axle, a secondary drive chain trained between the secondary driving and driven sprockets, an idle sprocket rotatably mounted on the rear wheel axle, and a ratchet clutch disposed between the rear wheel axle and the secondary driven sprocket to disengage the secondary driven sprocket from the rear wheel axle when the primary drive chain is trained between the primary driving and driven sprocket clusters and to engage the secondary driven sprocket and the rear wheel axle so as to drive rotatably the rear wheel axle when the primary drive chain is trained between the primary driving sprocket cluster and the idle sprocket. The secondary driving sprocket should be smaller than a smallest sprocket of the primary driving sprocket cluster, and the secondary driven sprocket should be larger than a largest sprocket of the primary driven sprocket cluster.

1 Claim, 7 Drawing Sheets

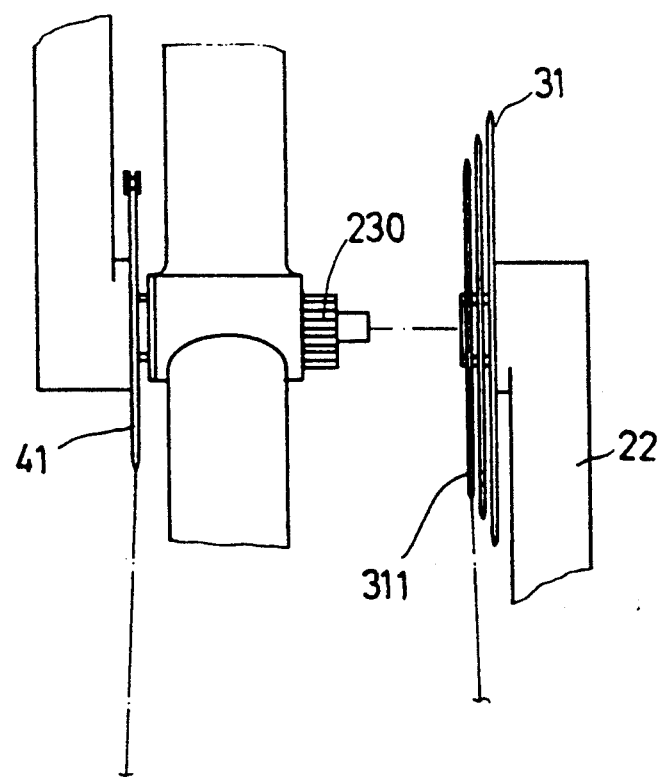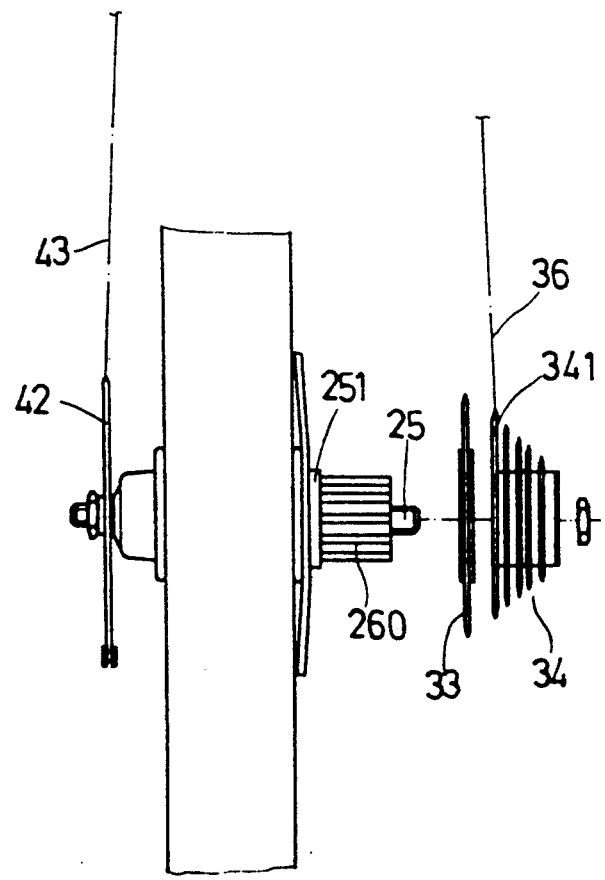
FIG. 4

BICYCLE POWER TRAIN ASSEMBLY

BACKGROUND OF THE INVENTION

1. Field of the Invention

The invention relates to a bicycle power train assembly, more particularly to a bicycle power train assembly which permits a further reduction in the force which is to be applied when climbing an uphill slope.

2. Description of the Related Art

Referring to FIG. 1, a conventional bicycle power train assembly is shown to comprise a pedal (1) which is used to rotate a crank axle (2) and a driving sprocket cluster (3). A driven sprocket cluster (5) is mounted on a rear wheel axle (4). A drive chain (6) is trained between the driving and driven sprocket clusters (3, 5). Front and rear derailleurs (7, 8) are provided to train the drive chain (6) on a selected sprocket of the sprocket clusters (3, 5).

Note that the smallest sprocket of the driving sprocket cluster (3) should not be too small so as to prevent the front derailleur (7) from latching onto the bicycle frame.

The bicycle power train assembly further includes a tension wheel (9) which is operated so as to compensate for the resulting difference in the tension of the drive chain (6) when the drive chain (6) is trained from one sprocket to another. Note that the largest sprocket of the driven sprocket cluster (5) should not be too large. Otherwise, the required length of the drive chain (6) becomes longer, making it difficult for the tension wheel (9) to maintain the drive chain (6) in tension when the drive chain (6) is trained on the smaller sprockets of the driving and driven sprocket clusters (3, 5).

Note that less force is required to move the bicycle forward if the drive chain (6) is trained on the smallest sprocket of the driving sprocket cluster (3). However, since the size of the smallest sprocket of the driving sprocket cluster (3) cannot be too small because of the above mentioned reason, a further reduction in the force which is to be applied when climbing an uphill slope is not possible.

SUMMARY OF THE INVENTION

Therefore, the main objective of the present invention is to provide a bicycle power train assembly which permits a further reduction in the force that is to be applied when climbing an uphill slope.

Accordingly, the preferred embodiment of a bicycle power train assembly of the present invention comprises:

a crank axle having first and second ends;

a primary driving sprocket cluster means mounted on the first end of the crank axle and having a plurality of primary driving sprockets of varying diameters;

a rear wheel axle having first and second ends;

a primary driven sprocket cluster means mounted on the first end of the rear wheel axle and having a plurality of primary driven sprockets of varying diameters;

a primary drive chain trained between the primary driving cluster means and the primary driven sprocket cluster means;

rotation of the primary driving sprocket cluster means being transmitted to drive rotatably the rear wheel axle when the primary drive chain trains the primary driving sprocket cluster means and the primary driven sprocket cluster means;

a secondary driving sprocket mounted on the second end of the crank axle and rotating with the crank axle, said secondary driving sprocket being smaller than a smallest one of the primary driving sprockets;

a secondary driven sprocket mounted on the second end of the rear wheel axle and being larger than a largest one of the primary driven sprockets;

a secondary drive chain trained between the secondary driving sprocket and the secondary driven sprocket;

an idle sprocket means rotatably mounted on the rear wheel axle between the first and second ends of the rear wheel axle; and a ratchet clutch means disposed between the second end of the rear wheel axle and the secondary driven sprocket to disengage the secondary driven sprocket from the rear wheel axle so as to permit idle rotation of the secondary driven sprocket when the primary drive chain is trained between the primary driving sprocket cluster means and the primary driven sprocket cluster means and to engage the secondary driven sprocket and the rear wheel axle so as to drive rotatably the rear wheel axle when the primary drive chain is trained between the primary driving sprocket cluster means and the idle sprocket means.

BRIEF DESCRIPTION OF THE DRAWINGS

Other features and advantages of the present invention will become apparent in the following detailed description of the preferred embodiments, with reference to the accompanying drawings, of which:

FIG. 4 is a top view of the first preferred embodiment when in a semi-assembled state;

DETAILED DESCRIPTION OF THE PREFERRED EMBODIMENTS

Figure 1:
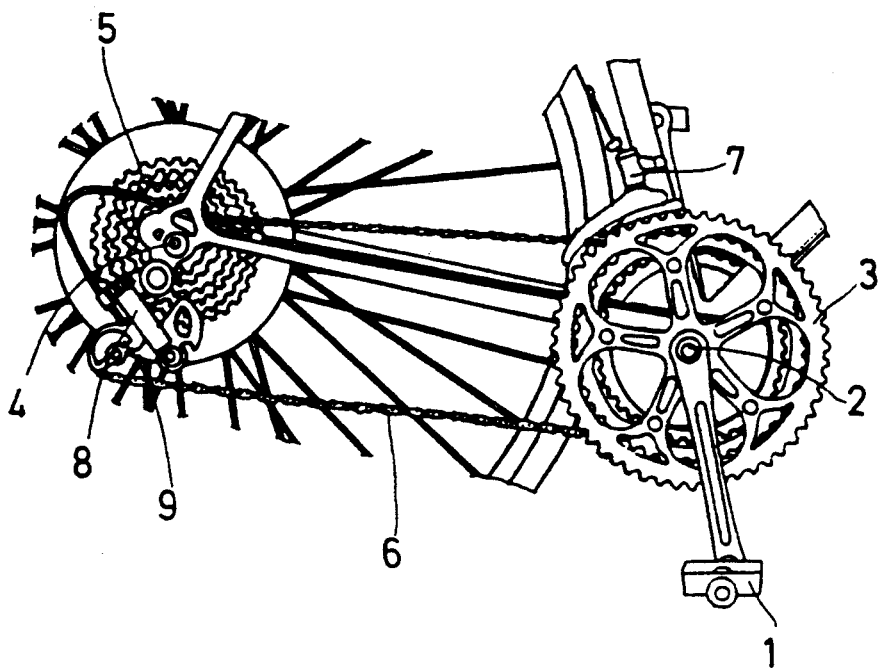
FIG. 1 is an illustration of a conventional bicycle power train assembly.
Figure 2:
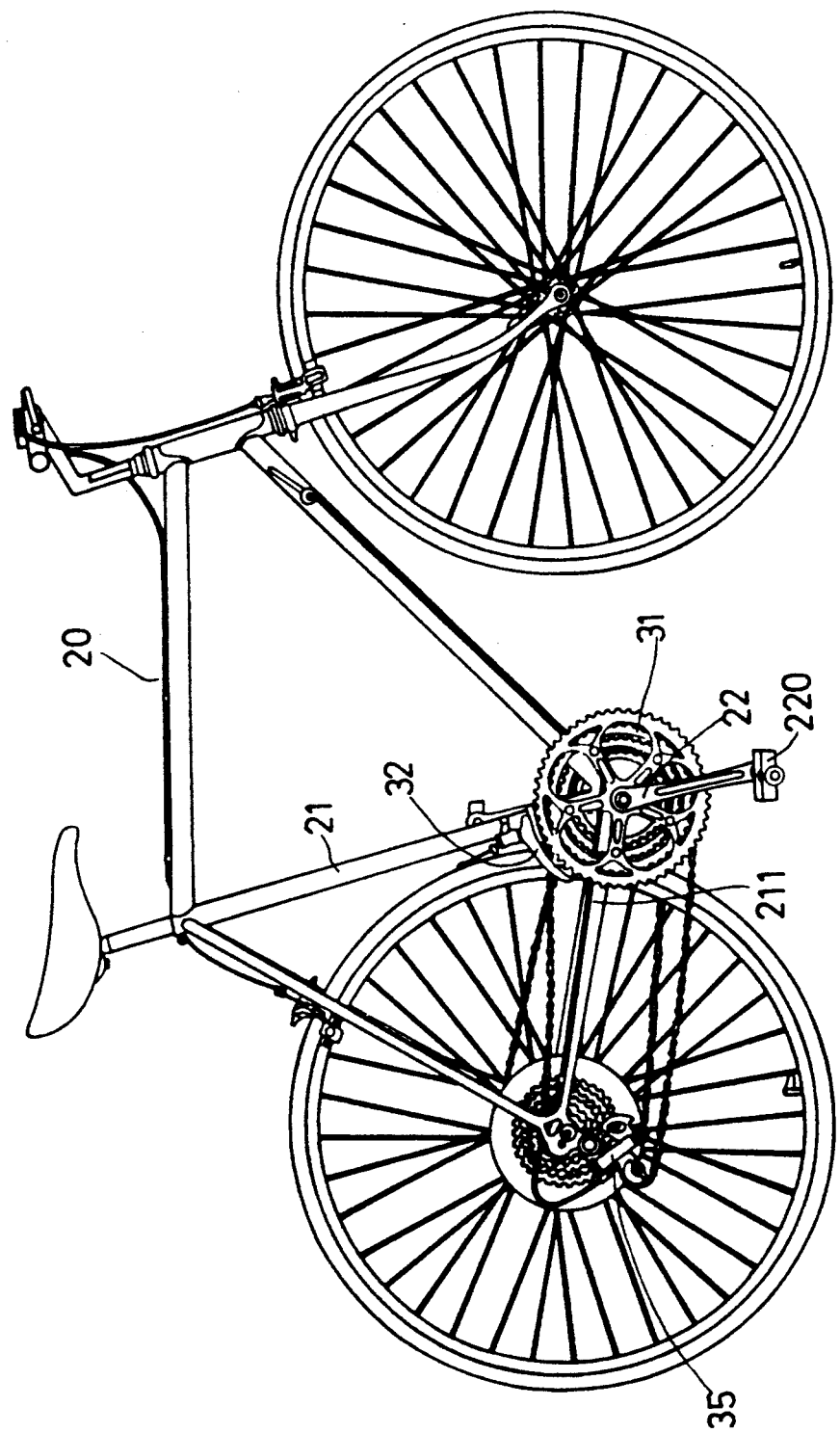
FIG. 2 is an illustration of the first preferred embodiment of a bicycle power train assembly according to the present invention when installed on a bicycle frame.
Figure 3:
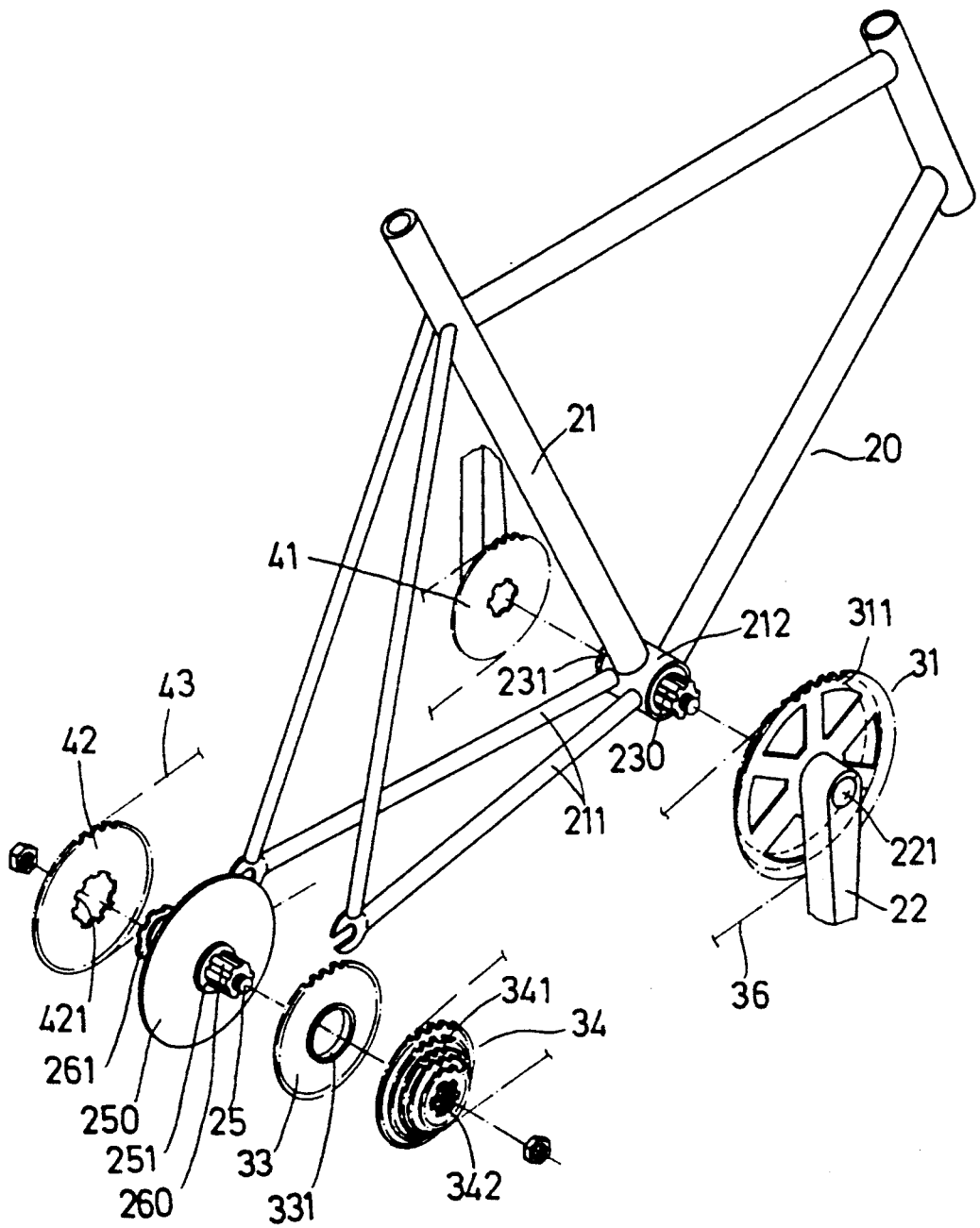
FIG. 3 is an exploded view of the first preferred embodiment.

Referring to FIGS. 2 and 3, the first preferred embodiment of a bicycle power train assembly according to the present invention is shown to be installed on a bicycle frame (20). The bicycle frame (20) includes a seat tube (21) and a pair of chain stays (211) which are secured to a tubular connector (212). The crank axle (221) of a crank arm (22) extends into the tubular connector (212). The two ends of the crank axle (221) extend out of the tubular connector (212) and are respectively formed with ratchet teeth (230, 231). A rear wheel axle (25) is rotatably mounted on one end of the chain stays (211). A disc (250) is formed on an intermediate portion of the axle (25). The axle (25) is further formed with an annular seat (251) which is disposed on one side of the disc (250). The two ends of the axle (25)

are respectively formed with rearwardly inclining ratchet teeth (260, 261).

A primary driving sprocket cluster (31) is mounted on the crank axle (221). The sprockets (311) of the primary driving sprocket cluster (31) are of varying diameters and engage the ratchet teeth (230) of the crank axle (221). A front derailleur (32) is secured onto the seat tube (21) adjacent to the primary driving sprocket cluster (31). An idle sprocket (33) is provided on the axle (25) and has a hub (331) which is in sliding contact with the annular seat (251). A primary driven sprocket cluster (34) is provided on the axle (25) on one side of the idle sprocket (33). The sprockets (341) of the primary driven sprocket cluster (34) are of varying diameters and are provided with forwardly inclining ratchet teeth (342) which engage the ratchet teeth (260) of the axle (25). A rear derailleur (35) is secured on one of the chain stays (211) adjacent to the primary driven sprocket cluster (34). A primary drive chain (36) is trained between the primary driving and driven sprocket clusters (31, 34). The front and rear derailleurs (32, 35) are operated so as to train the primary drive chain (36) on a selected sprocket (311, 341) of the sprocket clusters (31, 34).

Referring to FIGS. 2 and 4, a secondary driving sprocket (41) is mounted on the other end of the crank axle (221) on the side of the bicycle frame (20) opposite to the sprocket clusters (31, 34). The secondary driving sprocket (41) is smaller than the smallest sprocket (311) of the primary driving sprocket cluster (31) and engages the ratchet teeth (231) of the crank axle (221). A secondary driven sprocket (42) is provided on the axle (25) on the other side of the disc (250) opposite to the idle sprocket (33). The secondary driven sprocket (42) is larger than the largest sprocket (341) of the primary driven sprocket cluster (34) and is provided with forwardly inclining ratchet teeth (421) which cooperate with the ratchet teeth (261) of the axle (25) to form a ratchet clutch unit. Finally, a secondary drive chain (43) is trained between the secondary driving and driven sprockets (41, 42).

Figure 5:
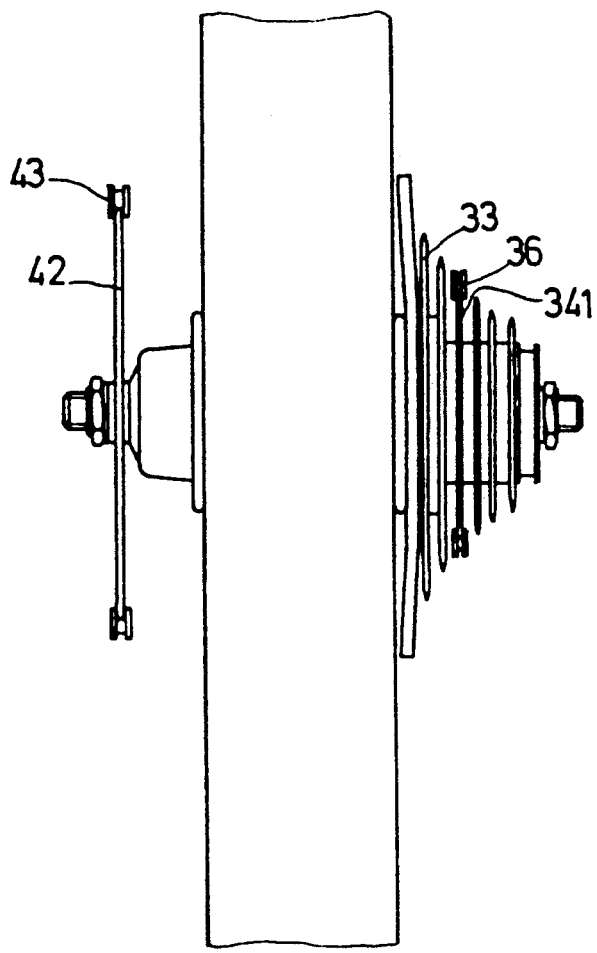
FIG. 5 is a rear view of the first preferred embodiment when in a normal operating mode.
Figure 6:
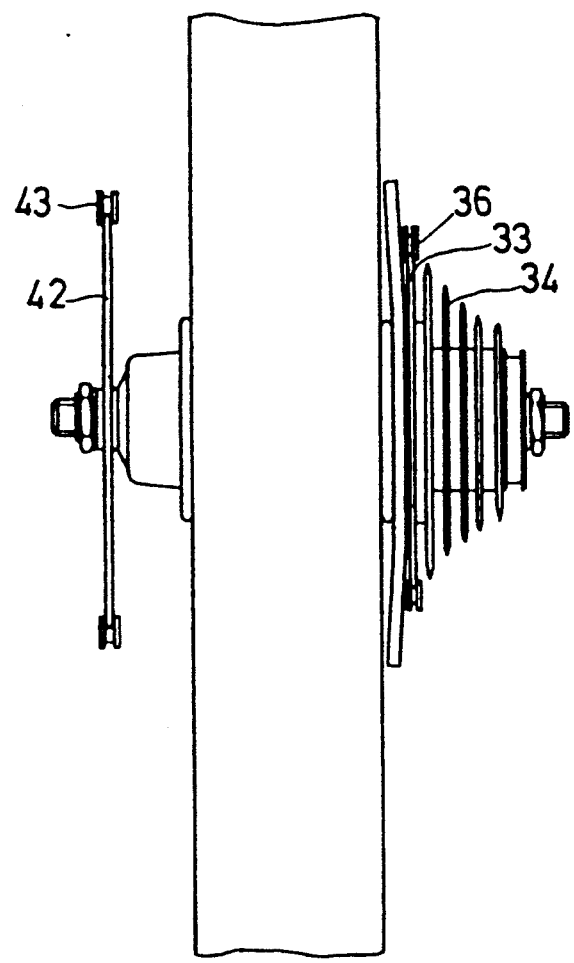
FIG. 6 is a rear view of the first preferred embodiment when in a force reduction operating mode.

The operation of the first preferred embodiment is as follows:

Referring to FIGS. 2, 4 and 5, when the first preferred embodiment is in the normal operating mode, a pedal (220) secured on one end of the crank arm (22) is operated so as to rotate the crank arm (22) and thereby rotate the crank axle (221). The crank axle (221) causes the primary driving sprocket cluster (31) to rotate therewith and move the primary drive chain (36). The primary drive chain (36) is trained on a selected one of the sprockets (341) of the primary driven sprocket cluster (34), thereby causing the latter to rotate. Rotation of the primary driven sprocket cluster (34) is transmitted to the axle (25), thereby enabling the bicycle to move forward.

Note that operation of the crank arm (22) does not only result in the rotation of the primary driving sprocket cluster (31), the primary drive chain (36) and the primary driven sprocket cluster (34) but can also result in the rotation of the secondary driving sprocket (41), the secondary drive chain (43) and the secondary driven sprocket (42). Since the ratio of the diameters of the secondary driving and driven sprockets (41, 42) is smaller than that of the trained sprockets (311, 341) of the primary driving and driven sprocket clusters (31, 34), the secondary driven sprocket (42) rotates at a slower pace as compared to the axle (25). The ratchet teeth (261) of the axle (25) move past the ratchet teeth (421) of the secondary driven sprocket (42) and do not engage the same. The secondary driven sprocket (42) therefore rotates idly relative to the axle (25) and does not exert any force on the same. The front and rear derailleurs (32, 35) may be operated so as to train the primary drive chain (36) on a selected sprocket (311, 341) of the sprocket clusters (31, 34) to vary the speed setting of the bicycle.

When climbing an uphill slope, the front derailleur (32) is operated so as to train the primary drive chain (36) on the smallest sprocket (311) of the primary driving sprocket cluster (31), and the rear derailleur (35) is operated so as to train the primary drive chain (36) on the largest sprocket (341) of the primary driven sprocket cluster (34). Less force is therefore required so as to move the bicycle along the uphill slope. Note that the size of the smallest sprocket (311) of the primary driving sprocket cluster (31) should not be too small in order to prevent the front derailleur (32) from latching onto one of the chain stays (211). A further reduction in the force which is to be applied so as to move the bicycle along the uphill slope is therefore not possible with the use of the primary driving sprocket cluster (31).

In order to permit further reductions in the required applied force, the rear derailleur (35) is operated so as to train the primary drive chain (36) onto the idle sprocket (33). Rotation of the primary driving sprocket cluster (31) can therefore cause the rotation of the idle sprocket (33) but does not cause the rotation of the axle (25) since the idle sprocket (33) is incapable of rotatably driving the axle (25). Initially, the axle (25) is stationary relative to the secondary driven sprocket (42), thereby causing the ratchet teeth (421) of the secondary driven sprocket (42) to contact the ratchet teeth (261) of the axle (25) and cause the axle (25) to rotate and enable the bicycle to move forward. Note that the primary driven sprocket cluster (34) is at a stationary state relative to the axle (25) at this stage. That is, the ratchet teeth (260) of the axle (25) move past the ratchet teeth (342) of the primary driven sprocket cluster (34) and do not engage the same. A reduction in the force which is to be applied when climbing an uphill slope is thus obtained since the ratio of the diameters of the front and secondary driven sprockets (41, 42) is smaller than that of the diameters of the sprockets (311, 341) of the primary and primary driven sprocket clusters (31, 34).

Figure 7:
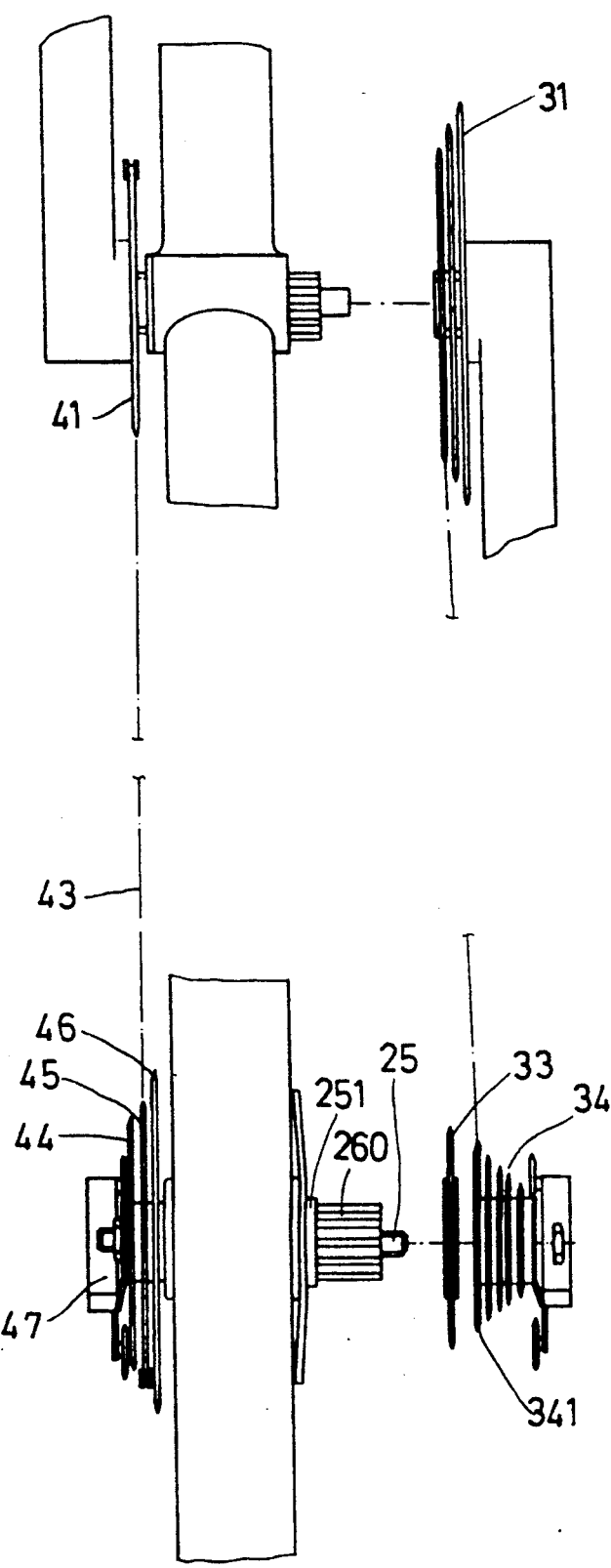
FIG. 7 is a top view illustrating the second preferred embodiment of a bicycle power train assembly according to the present invention when in a semi-assembled state.

FIG. 7 is an illustration of the second preferred embodiment of a bicycle power train assembly according to the present invention. The second preferred embodiment is substantially similar to the first preferred embodiment. The main difference lies in the replacement of the secondary driven sprocket (42) of the first preferred embodiment by three secondary driven sprockets (44, 45, 46) of varying diameters. As with the secondary driven sprocket (42), the secondary driven sprockets (44, 45, 46) are larger than the largest sprocket (341) of the primary driven sprocket cluster (34). A third derailleur (47) is provided so as to train the secondary drive chain (43) onto a selected one of the secondary driven sprockets (44, 45, 46). Different ratios in the diameters of the secondary driving and driven sprockets (41, 44, 45, 46) are thus obtained so as to provide additional speed settings for the bicycle.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:
1. A bicycle power train assembly, including
   a crank axle having first and second ends;
   a primary driving sprocket cluster means mounted on said first end of said crank axle and having a plurality of primary driving sprockets of varying diameters;
   a rear wheel axle having first and second ends;
   a primary driven sprocket cluster means mounted on said first end of said rear wheel axle and having a plurality of primary driven sprockets of varying diameters; and
   a primary drive chain trained between said primary driving cluster means and said primary driven sprocket cluster means;
   rotation of said primary driving sprocket cluster means being transmitted to drive rotatably said rear wheel axle when said primary drive chain trains said primary driving sprocket cluster means and said primary driven sprocket cluster means;
   a secondary driving sprocket mounted on said second end of said crank axle and rotating with said crank axle, said secondary driving sprocket being smaller than a smallest one of said primary driving sprockets;
   a secondary driven sprocket mounted on said second end of said rear wheel axle and being larger than a largest one of said primary driven sprockets;
   a secondary drive chain trained between said secondary driving sprocket and said secondary driven sprocket;
   an idle sprocket means rotatably mounted on said rear wheel axle between said first and second ends of said rear wheel axle; and
   a ratchet clutch means disposed between said second end of said rear wheel axle and said secondary driven sprocket to disengage said secondary driven sprocket from said rear wheel axle so as to permit idle rotation of said secondary driven sprocket when said primary drive chain is trained between said primary driving sprocket cluster means and said primary driven sprocket cluster means and to engage said secondary driven sprocket and said rear wheel axle so as to drive rotatably said rear wheel axle when said primary drive chain is trained between said primary driving sprocket cluster means and said idle sprocket means.

* * * * *